United States Patent
Ghike et al.

(10) Patent No.: US 10,167,948 B2
(45) Date of Patent: Jan. 1, 2019

(54) HYDRAULIC CONTROL SYSTEM FOR AN AUTOMATIC TRANSMISSION

(71) Applicant: GM Global Technology Operations LLC, Detroit, MI (US)

(72) Inventors: Chinar S. Ghike, Farmington Hills, MI (US); Brian W. Whitmarsh, Commerce, MI (US); Joel H. Gunderson, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 66 days.

(21) Appl. No.: 15/450,704

(22) Filed: Mar. 6, 2017

(65) Prior Publication Data

US 2017/0268666 A1  Sep. 21, 2017

Related U.S. Application Data

(60) Provisional application No. 62/309,661, filed on Mar. 17, 2016.

(51) Int. Cl.
*F16H 61/00* (2006.01)
*F16H 61/02* (2006.01)
(Continued)

(52) U.S. Cl.
CPC ......... *F16H 61/0267* (2013.01); *F16D 48/06* (2013.01); *F16H 61/00* (2013.01);
(Continued)

(58) Field of Classification Search
CPC .. F16H 61/00; F16H 61/0267; F16H 61/0021; F16H 61/12; F16H 2061/1232;
(Continued)

(56) References Cited

U.S. PATENT DOCUMENTS

| 4,653,352 A | 3/1987 | Nakao et al. |
| 4,944,202 A | 7/1990 | Gierer |

(Continued)

FOREIGN PATENT DOCUMENTS

| DE | 4320353 A1 | 1/1994 |
| DE | 29714652 U1 | 11/1997 |

(Continued)

OTHER PUBLICATIONS

Expired U.S. Appl. No. 62/157,271, filed May 5, 2015.

*Primary Examiner* — Leslie A Nicholson, III

(57) ABSTRACT

A hydraulic control system for a motor vehicle transmission includes a pressure regulation subsystem in fluid communication with a pump for providing pressurized hydraulic fluid. A manual valve assembly is in direct fluid communication with the pressure regulation subsystem, and is moveable by an operator of the motor vehicle between at least park, neutral, drive, and reverse positions. A default disable valve assembly is in direct fluid communication with the manual valve assembly, a default disable solenoid, and a default select valve assembly. The manual valve assembly is in direct fluid communication with the default disable valve assembly which is in direct fluid communication with the default disable solenoid and the default select valve assembly. The default disable solenoid enables the default disable valve assembly to enable three default modes of operation and the default select valve assembly selects between two of the three default modes of operation.

20 Claims, 7 Drawing Sheets

(51) Int. Cl.
*F16D 48/06* (2006.01)
*F16H 61/12* (2010.01)
*F16D 48/02* (2006.01)

(52) U.S. Cl.
CPC ......... *F16H 61/0021* (2013.01); *F16H 61/12* (2013.01); *F16D 48/0206* (2013.01); *F16D 2048/0209* (2013.01); *F16H 2061/1232* (2013.01); *F16H 2061/1236* (2013.01)

(58) Field of Classification Search
CPC ................. F16D 48/06; F16D 48/0206; F16D 2048/0209
USPC .................................................. 475/116, 131
See application file for complete search history.

(56) References Cited

U.S. PATENT DOCUMENTS

| | | | |
|---|---|---|---|
| 5,240,093 A | | 8/1993 | Wagner et al. |
| 5,441,459 A | | 8/1995 | Inukai et al. |
| 5,790,969 A | * | 8/1998 | McKee ................. F16D 48/068 192/3.58 |
| 6,357,289 B1 | * | 3/2002 | Futawatari ............... F16H 61/12 73/114.36 |
| 6,715,597 B1 | | 4/2004 | Buchanan et al. |
| 7,270,027 B2 | | 9/2007 | Berger et al. |
| 7,300,375 B2 | | 11/2007 | Petrzik |
| 7,487,866 B2 | | 2/2009 | Kruse et al. |
| 8,113,988 B2 | * | 2/2012 | Foster ................... B60W 10/02 477/125 |
| 8,435,148 B2 | * | 5/2013 | Moorman ........... F16D 48/0206 475/116 |
| 8,500,600 B2 | | 8/2013 | Moorman |
| 8,591,381 B2 | | 11/2013 | Zhang et al. |
| 8,894,545 B2 | * | 11/2014 | Berger ................. F16H 59/08 475/130 |
| 8,894,546 B2 | * | 11/2014 | Hagelskamp ....... F16H 61/0206 477/131 |
| 8,932,167 B2 | | 1/2015 | Berger et al. |
| 9,599,214 B2 | | 3/2017 | Lundberg et al. |
| 9,772,033 B2 | * | 9/2017 | McDonough ....... F16H 61/0267 |
| 9,982,774 B1 | * | 5/2018 | Jin ..................... F16H 61/0206 |
| 2001/0036878 A1 | | 11/2001 | Itou et al. |
| 2002/0060113 A1 | | 5/2002 | Harries |
| 2002/0119864 A1 | | 8/2002 | Harries |
| 2003/0075408 A1 | | 4/2003 | Afredsson |
| 2004/0038765 A1 | | 2/2004 | Fujimine et al. |
| 2007/0175726 A1 | | 8/2007 | Combes et al. |
| 2008/0207392 A1 | | 8/2008 | Staudinger et al. |
| 2008/0210032 A1 | | 9/2008 | Uberti et al. |
| 2009/0151495 A1 | | 6/2009 | Garabello et al. |
| 2009/0157271 A1 | | 6/2009 | Garabello et al. |
| 2014/0123799 A1 | | 5/2014 | Landino et al. |
| 2014/0360302 A1 | | 12/2014 | Lundberg |
| 2016/0167635 A1 | | 6/2016 | Neelakantan et al. |
| 2016/0327153 A1 | * | 11/2016 | Whitmarsh ......... F16H 61/0267 |

FOREIGN PATENT DOCUMENTS

| | | |
|---|---|---|
| DE | 19921301 A1 | 11/1999 |
| DE | 19849488 C2 | 11/2000 |
| DE | 19931973 A1 | 1/2001 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| EP | 0477564 B1 | 12/1996 |
| EP | 1469235 A1 | 10/2004 |
| EP | 1519082 A1 | 3/2005 |
| EP | 1645786 A2 | 4/2006 |
| EP | 2151586 A2 | 2/2010 |
| FR | 2808065 A1 | 10/2001 |
| GB | 1383567 A | 2/1974 |
| JP | 58102851 A | 6/1983 |
| JP | 2007010145 A | 1/2007 |
| WO | 9705410 A1 | 2/1997 |
| WO | 9919644 A1 | 4/1999 |
| WO | 2009037170 A1 | 3/2009 |
| WO | 2010028745 A2 | 3/2010 |

* cited by examiner

HYDRAULIC CONTROL SYSTEM FOR AN AUTOMATIC TRANSMISSION

CROSS REFERENCE TO RELATED APPLICATIONS

This application claims the benefit of U.S. Provisional application No. 62/309,661, filed on Mar. 17, 2016, the entire contents of which are incorporated herein by reference.

INTRODUCTION

The invention relates to a hydraulic control system for an automatic transmission, and more particularly to a hydraulic control system for an automatic transmission having a manual valve and two forward and one reverse default gear states.

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need exists for new and improved hydraulic control system configurations within transmissions which exhibit improved performance, especially during default conditions. A default condition is a hydraulic state that the transmission experiences in the absence of electronic control. A transmission in default no longer has the capability to electronically command solenoids to achieve the desired gear state. The default condition may have been intentionally commanded (e.g. when diagnostics indicate corrupt solenoid drivers, corrupt controllers, controller shutdown at high temperatures) or can occur unintentionally due to a hardware failure (e.g. controller failure, wiring harness failure, solenoid driver failure). For some transmission configurations, the hydraulic control system shifts the transmission to neutral during a default condition. Accordingly, there is a need for an improved, cost-effective hydraulic control system for use in a hydraulically actuated automatic transmission that provides forward and reverse driving states during default conditions.

SUMMARY

According to several aspects of the present disclosure a hydraulic control system for a transmission of a motor vehicle includes a pressure regulation subsystem in fluid communication with a pump for providing pressurized hydraulic fluid. The hydraulic control system further includes a manual valve assembly in direct fluid communication with the pressure regulation subsystem. The manual valve assembly is moveable by an operator of the motor vehicle between at least a park position, a neutral position, a drive position, and a reverse position. The hydraulic control system further includes a default disable valve assembly in direct fluid communication with the manual valve assembly. The hydraulic control system further includes a default disable solenoid in direct fluid communication with the default disable valve assembly and a default select valve assembly in direct fluid communication with the default disable valve assembly. The manual valve assembly is in direct fluid communication with the default disable valve assembly which is in direct fluid communication with the default disable solenoid and the default select valve assembly. The default disable solenoid enables the default disable valve assembly to enable three default modes of operation and the default select valve assembly selects between two of the three default modes of operation.

In another aspect of the present disclosure the hydraulic control system further includes a plurality of clutches and a plurality of clutch regulation valve assemblies each in direct fluid communication with the pressure regulation subsystem and in fluid communication with the manual valve assembly, and in fluid communication with the default disable valve assembly, and in communication with the default select valve assembly. A plurality of clutches is selectively engaged by the plurality of clutch regulation valve assemblies.

In yet another aspect of the present disclosure each of the plurality of clutch regulation valve assemblies includes an exhaust port that exhausts a respective one of the plurality of clutches in a normal mode of operation. Each of the exhaust ports is in selective communication with the default disable valve assembly and the default select valve assembly for selectively receiving pressurized hydraulic fluid to provide two forward gears and a reverse gear during a default mode of operation.

In yet another aspect of the present disclosure the exhaust ports of each of the plurality of clutch regulation valve assemblies selectively communicates with the default disable valve assembly or the default select valve assembly via a plurality of three-way valves.

In yet another aspect of the present disclosure the default disable valve assembly selectively communicates pressurized hydraulic fluid from the manual valve assembly when in the drive position to the default select valve assembly, and wherein the default select valve assembly selectively communicates the pressurized hydraulic fluid to one of a first subset of the clutch regulation valve assemblies to provide a low gear ratio and to a second subset of the clutch regulation valve assemblies to provide a high gear ratio higher than the low gear ratio.

In yet another aspect of the present disclosure the default disable valve assembly selectively communicates pressurized hydraulic fluid from the manual valve assembly when in the reverse position to a subset of the plurality of three-way valves to provide a reverse gear ratio.

In yet another aspect of the present disclosure the position of the default disable valve assembly is controlled by pressurized hydraulic fluid from the manual valve assembly when in the drive or reverse positions and from pressurized hydraulic fluid from a feed limit valve assembly and a spring.

In yet another aspect of the present disclosure the position of the default select valve assembly is controlled by pressurized hydraulic fluid from the manual valve assembly and a spring when engaged in the high gear, from at least one of the plurality of clutch regulation valve assemblies engaged in the low gear and the spring, and from the manual valve assembly and at least one of the plurality of clutch regulation valve assemblies engaged in the reverse gear.

In yet another aspect of the present disclosure the plurality of clutches includes six clutches selectively engageable in combinations of four to provide at least 10 forward speed ratios and one reverse speed ratio.

In yet another aspect of the present disclosure a hydraulic control system for a transmission of a motor vehicle includes a pressure regulation subsystem in fluid communication with a pump for providing pressurized hydraulic fluid. The hydraulic control system further includes a manual valve assembly in direct fluid communication with the pressure regulation subsystem. The manual valve assembly is moveable by an operator of the motor vehicle between at least a park position, a neutral position, a drive position, and a reverse position and selectively provides a drive fluid signal and a reverse fluid signal from the pressurized hydraulic fluid. The hydraulic control system further includes a default disable solenoid in fluid communication with the pressure regulation subsystem and a default disable valve assembly in fluid communication with the default disable solenoid. The default disable solenoid selectively engages the default disable valve assembly through an ON/OFF signal. The default disable valve assembly receives the drive fluid signal and the reverse fluid signal, and the default disable valve assembly has a first position that terminates the drive fluid signal and the reverse fluid signal when the default disable valve assembly receives the ON signal from a default disable solenoid. The default disable valve assembly has a second position that communicates the drive fluid signal and the reverse fluid signal to a drive default fluid signal and a reverse default fluid signal when the default disable valve assembly receives the OFF signal from the default disable solenoid. The hydraulic control system further includes a default select valve assembly that receives the drive default fluid signal, the default select valve assembly having a first position that communicates the drive default fluid signal to a first exhaust signal and a second position that communicates the drive default fluid signal to a second exhaust signal. The hydraulic control system further includes a plurality of clutch regulation valve assemblies each in direct fluid communication with the pressure regulation subsystem and selectively in fluid communication with the first exhaust signal, the second exhaust signal, the drive default signal, and the reverse default signal. The hydraulic control system further includes a plurality of clutches selectively engaged by the plurality of clutch regulation valve assemblies. The default disable solenoid enables the default disable valve assembly, and the default disable valve assembly enables three default modes of operation and the default select valve assembly selects between two of the three default modes of operation.

In yet another aspect of the present disclosure the three default modes of operation include a low forward gear, a high forward gear, and a reverse gear, and the default select valve assembly selects between the low forward gear and the high forward gear.

In yet another aspect of the present disclosure the plurality of clutches includes six clutches selectively engageable in combinations of four to provide at least 10 forward speed ratios and one reverse speed ratio.

In yet another aspect of the present disclosure the plurality of clutch regulation valve assemblies includes six clutch regulation valve assemblies, each one in fluid communication with a respective one of the six clutches, and wherein each of the six clutch regulation valve assemblies includes an exhaust port that exhausts a respective one of the six clutches.

In yet another aspect of the present disclosure in the low gear the first exhaust signal communicates with a first and a second of six exhaust ports via a first three way valve, the drive default signal directly communicates with a third of the six exhaust ports, and the drive default signal communicates with a fourth of the six exhaust ports via a second three way valve. In the high gear the second exhaust signal communicates with a fifth and a sixth of the six exhaust ports via a third three way valve, the drive default signal directly communicates with the third of the six exhaust ports, and the drive default signal communicates with the fourth of the six exhaust ports via the second three way valve.

In yet another aspect of the present disclosure the first exhaust signal and drive default signal selectively engages a first subset of clutches to produce the low forward gear and the second exhaust signal and drive default signal selectively engages a second subset of clutches to produce the high forward gear when the hydraulic control system is in a default mode of operation and the manual valve assembly is in the drive position.

In yet another aspect of the present disclosure the low forward gear ratio is automatically engaged after the operator of the motor vehicle performs a key cycle on the motor vehicle while the default disable solenoid provides the OFF signal, or when the operator of the motor vehicle moves the manual valve assembly from the drive position, to the reverse position and back to the drive position.

In yet another aspect of the present disclosure the reverse default signal communicates with the first and second exhaust ports via the first three way valve, the reverse signal communicates with the fourth exhaust port via the second three way valve, and the reverse signal communicates with the sixth exhaust port via the third three way valve.

In yet another aspect of the present disclosure the reverse default signal engages a third subset of clutches to produce the reverse gear when the hydraulic control system is in the default mode of operation and the manual valve assembly is in the reverse position.

In yet another aspect of the present disclosure a hydraulic control system for a transmission of a motor vehicle includes a pressure regulation subsystem in fluid communication with a pump for providing pressurized hydraulic fluid, and a plurality of clutches for producing a plurality of forward gear ratios and a reverse gear ratio when selectively engaged. The hydraulic control system further includes a manual valve assembly in direct fluid communication with the pressure regulation subsystem. The manual valve assembly is moveable by an operator of the motor vehicle between at least a park position, a neutral position, a drive position, and a reverse position and selectively provides a drive fluid signal and a reverse fluid signal from the pressurized hydraulic fluid. The hydraulic control system further includes a default disable solenoid in fluid communication with the pressure regulation subsystem. The default disable solenoid selectively engages the default disable valve assembly through an ON/OFF signal. The default disable valve assembly receives the drive fluid signal and the reverse fluid signal, and the default disable valve assembly has a first position that terminates the drive fluid signal and the reverse fluid signal and when the default disable valve assembly receives the ON signal from a default disable solenoid. The default disable valve assembly has a second position that communicates the drive fluid signal and the reverse fluid signal to a reverse default fluid signal when the default disable valve assembly receives the OFF signal from the default disable solenoid. The hydraulic control system further includes a default select valve assembly that receives the drive default fluid signal, the default select valve assembly having a first position that communicates the drive default fluid signal to a first exhaust signal and a second position that communicates the drive default fluid signal to a second exhaust signal. The hydraulic control system further includes a plurality of clutch regulation valve assemblies each in direct fluid communication with the pressure regulation subsystem and selectively in fluid communication with the first exhaust signal, the second exhaust signal, the drive default signal, and the reverse default signal, the plurality of clutch regulation valve assemblies each having a disengaged position and an engaged position. When in the engaged position the clutch regulation valve assemblies communicate the pressurized fluid from the pressure regulation subsystem to the plurality of clutches and when in a disengaged system communicate the plurality of clutches with an exhaust port. During a default condition, the default disable valve assembly moves to the second position and the default select valve assembly initially selectively defaults to the first position or the second position based on which of the plurality of clutches are currently engaged when the default condition occurs in order to provide a low forward gear or a high forward gear when the manual valve assembly is in the drive position, or a reverse gear when the manual valve assembly is in the reverse position, and subsequently the default select valve assembly remains in the first position in order to provide a low forward gear when the operator of the motor vehicle performs a key cycle on the motor vehicle or when the operator moves the manual valve assembly from the drive position, to the reverse position and back to the drive position.

In yet another aspect of the present disclosure the low forward gear is a second gear ratio, and the high forward gear is a seventh gear ratio.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DESCRIPTION

Figure 1:
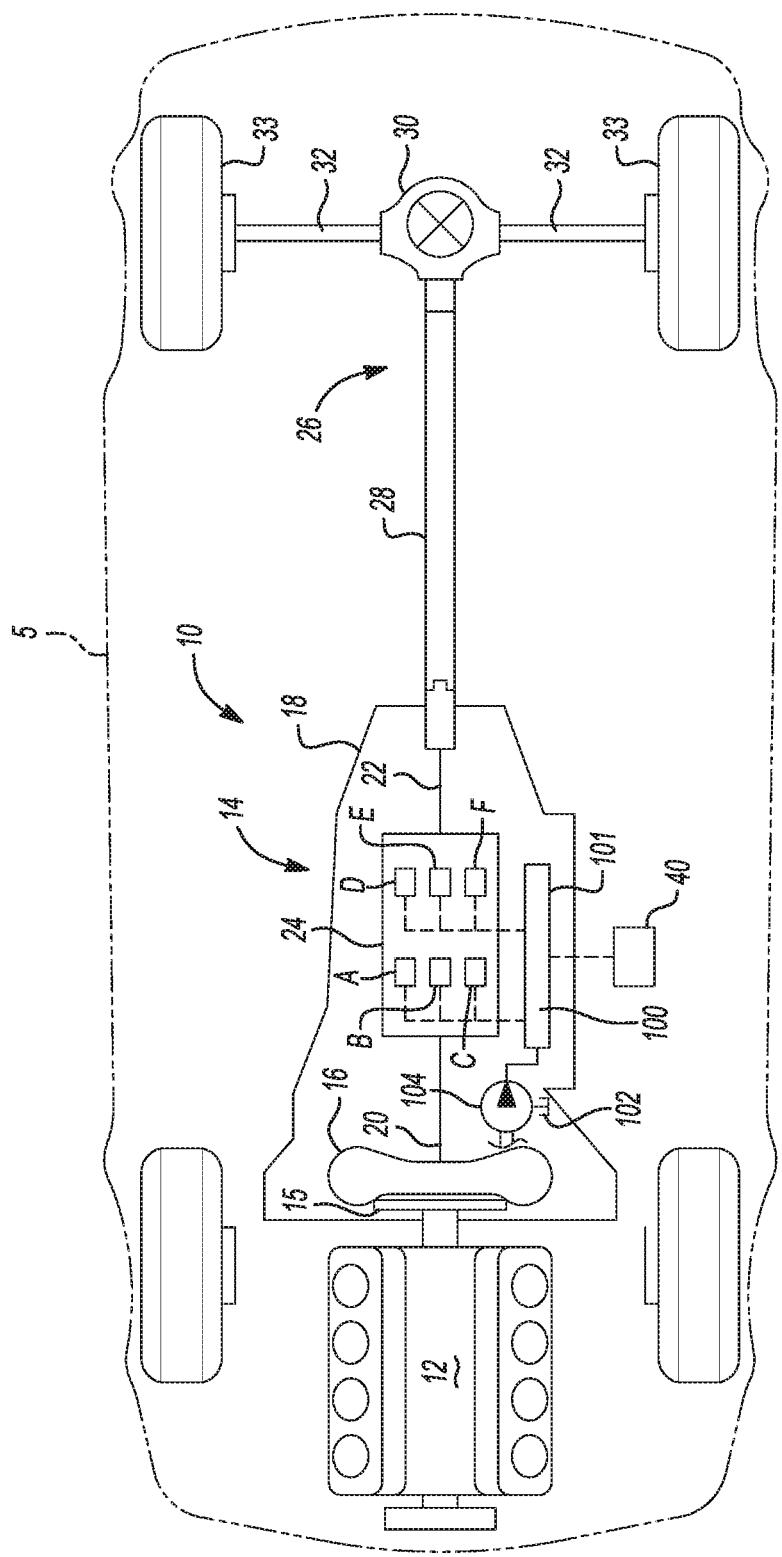
FIG. 1 is a is a schematic diagram of an exemplary powertrain in a motor vehicle according to the principles of the present disclosure.
Figure 2A:
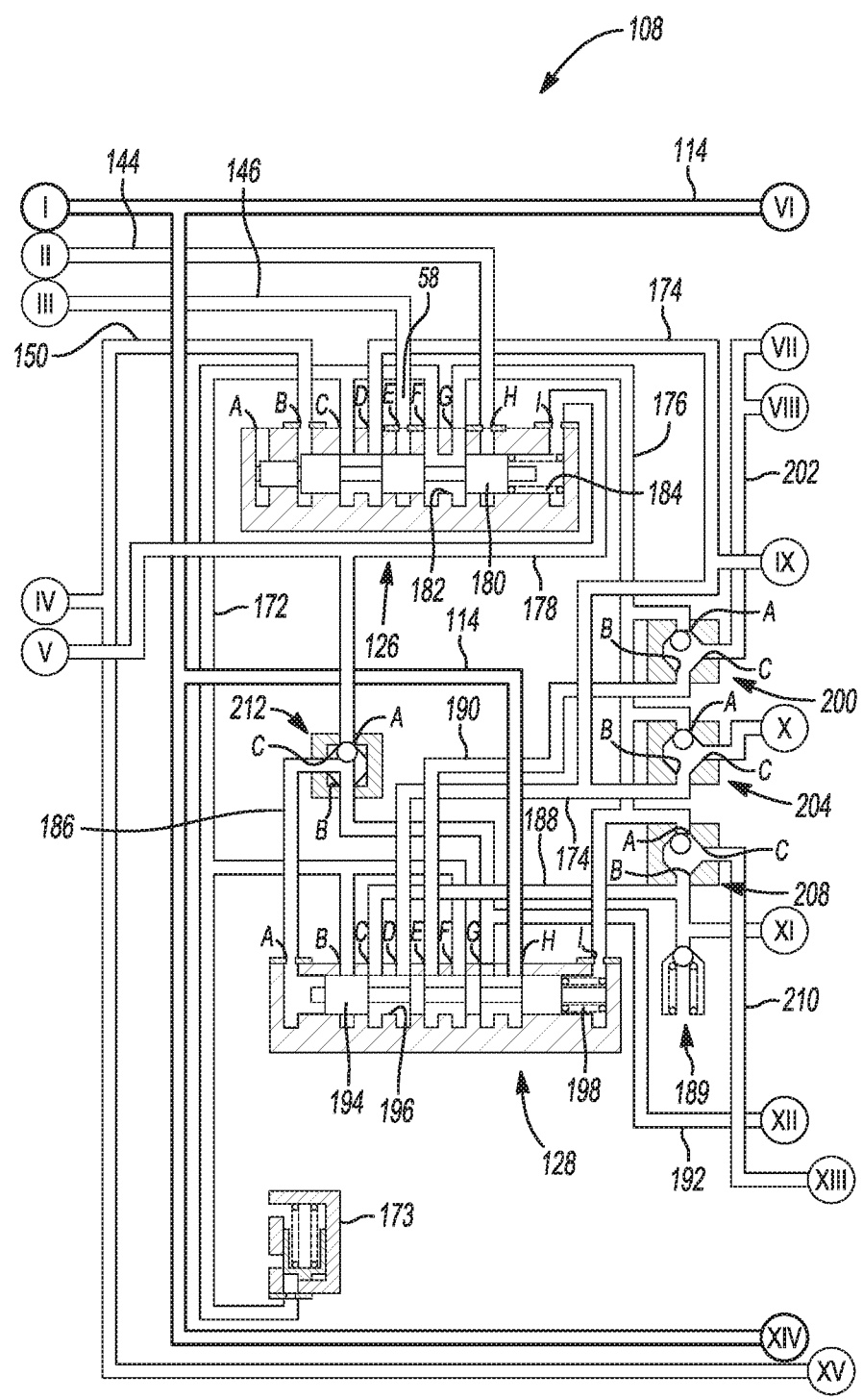
FIG. 2A is a diagram of a portion of a hydraulic control system according to the principles of the present disclosure.
Figure 2B:
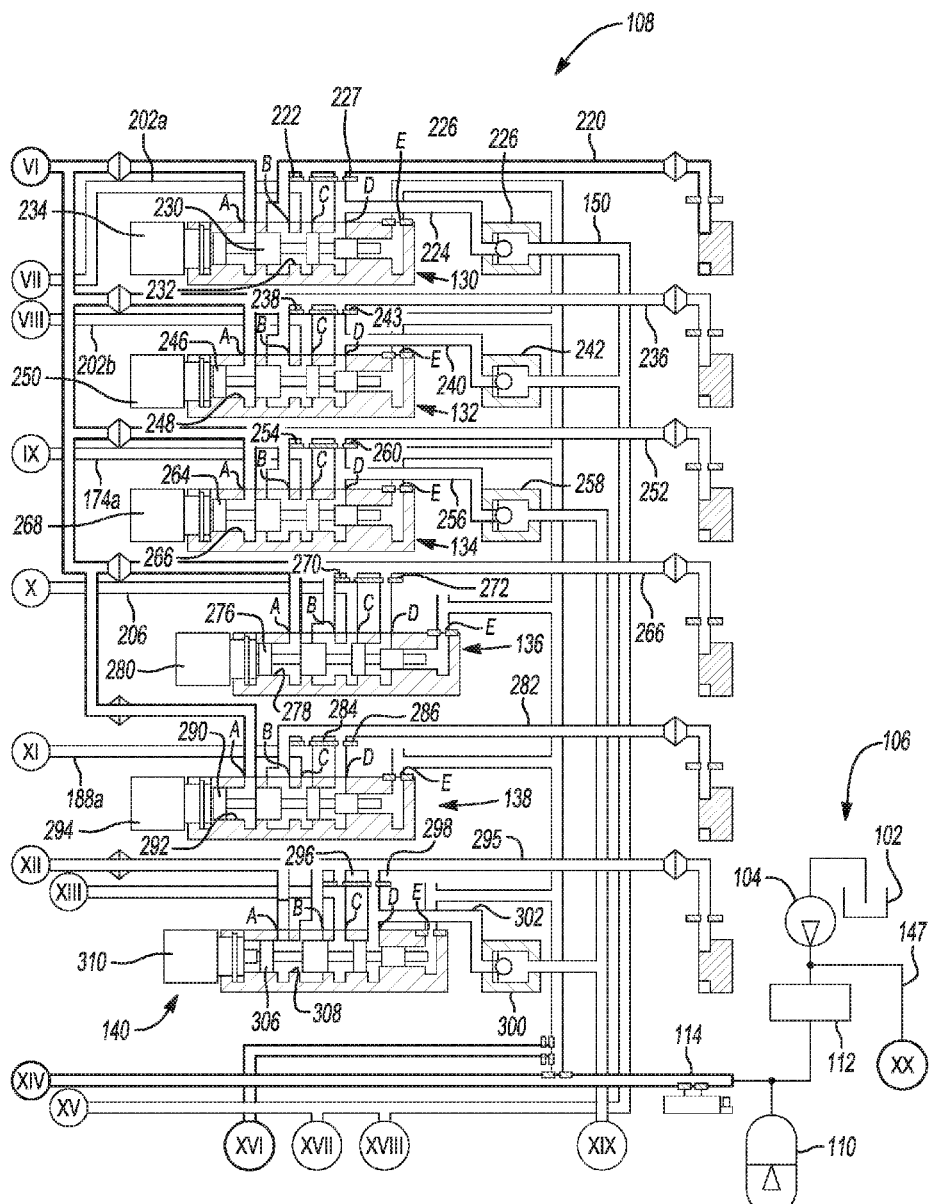
FIG. 2B is a diagram of a portion of a hydraulic control system according to the principles of the present disclosure.
Figure 2C:
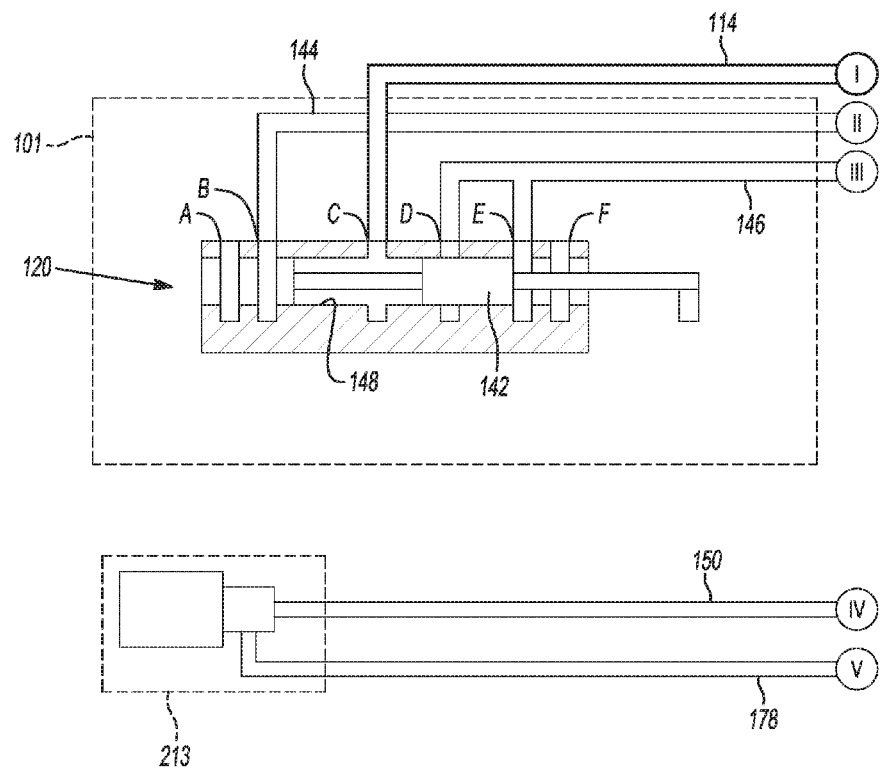
FIG. 2C is a diagram of a portion of a hydraulic control system according to the principles of the present disclosure.
Figure 2D:
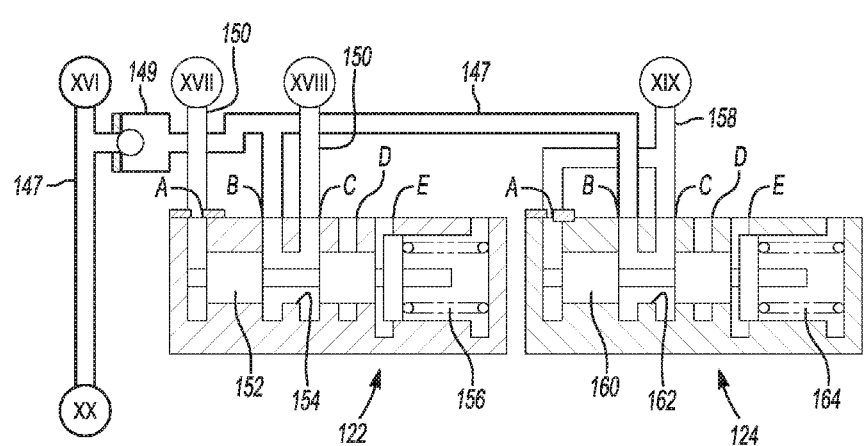
FIG. 2D is a diagram of a portion of a hydraulic control system according to the principles of the present disclosure.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, hybrid engine, or any other type of prime mover, without departing from the scope of the present disclosure. The engine 12 supplies a driving torque to the transmission 14 through a flexplate 15 or other connecting device that is connected to a starting device 16. The starting device 16 may be a hydrodynamic device, such as a fluid coupling or torque converter, a wet dual clutch, or an electric motor. It should be appreciated that any starting device 16 between the engine 12 and the transmission 14 may be employed including a dry launch clutch.

The transmission 14 has a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, six torque transmitting mechanisms indicated schematically by reference letters A-F, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The torque transmitting mechanisms A-F are selectively engageable in combinations of four to initiate at least one of ten forward gear or speed ratios and one reverse gear or speed ratio by selectively coupling individual gears within the plurality of gear sets to the plurality of shafts. In a preferred example, torque transmitting mechanisms A and B are friction brakes while torque transmitting mechanisms C-F are friction clutches. It should be appreciated that the specific arrangement and number of the gear sets and shafts within the transmission 14 may vary without departing from the scope of the present disclosure.

The motor vehicle 5 includes a transmission control module 40. The transmission control module 40 is preferably a non-generalized, electronic control device having a preprogrammed digital computer or processor, control logic or circuits, memory used to store data, and at least one I/O peripheral. The control logic includes or enables a plurality of logic routines for monitoring, manipulating, and generating data and control signals. The transmission control module 40 controls the actuation of the torque transmitting mechanisms A-F via a hydraulic control system 100.

The hydraulic control system 100 is disposed within a valve body 101 that contains and houses, via fluid paths and valve bores, most of the components of the hydraulic control system 100. These components include, but are not limited to, pressure regulation valves, directional valves, solenoids, etc. The valve body 101 may be attached to a bottom of the transmission housing 18 in rear-wheel drive transmissions or attached to a front of the transmission housing 18 in front-wheel drive transmissions. The hydraulic control system 100 is operable to selectively engage the clutches/brakes A-F and to provide cooling and lubrication to the transmission 14 by selectively communicating a hydraulic fluid from a sump 102 under pressure from either an engine driven pump 104 or an accumulator (not shown) or auxiliary electric pump (not shown). The pump 104 may be driven by the engine 12 or by an auxiliary engine or electric motor.

With reference to FIGS. 2A-D, a portion of the hydraulic control system 100 is illustrated. The hydraulic control system 100 generally includes a plurality of interconnected or hydraulically communicating subsystems including a pressure regulator subsystem 106 and a clutch control subsystem 108. The hydraulic control system 100 may also include various other subsystems or modules not illustrated in the drawings, such as a lubrication subsystem, a cooling subsystem, and a torque converter control subsystem each in communication with the pressure regulator subsystem 106.

The pressure regulator subsystem 106 is operable to provide and regulate pressurized hydraulic fluid, such as transmission oil, throughout the hydraulic control system 100. The pressure regulator subsystem 106 draws hydraulic fluid from the sump 102. The sump 102 is a tank or reservoir preferably disposed at the bottom of the transmission housing 18 to which the hydraulic fluid returns and collects from various components and regions of the transmission. The hydraulic fluid is forced from the sump 102 and communicated throughout the hydraulic control system 100 via the pump 104. The pump 104 may be, for example, a gear pump, a vane pump, a gerotor pump, or any other positive displacement pump. The pressure regulator subsystem 106 may also include an alternate source of hydraulic fluid that includes an auxiliary pump 110 preferably driven by an electric engine, battery, or other prime mover (not shown), or the alternate source may be an accumulator. The hydraulic fluid from the pump 104 is controlled by a pressure regulator valve 112. The pressure regulator valve 112 regulates the pressure of the hydraulic fluid from the pump 104 and feeds pressurized hydraulic fluid at line pressure to a main supply line 114. Likewise, the auxiliary pump 110 feeds pressurized hydraulic fluid to the main supply line 114. The main supply line 114 may include other branches and feed other subsystems without departing from the scope of the present invention. The pressure regulator subsystem 106 may also include various other valves and solenoids, such as a backflow regulator valve or isolator valve, without departing from the scope of the present invention.

The clutch control subsystem 108 controls the engagement and release of the torque transmitting mechanisms A-F. The clutch control subsystem 108 generally includes a manual valve assembly 120, a feed limit low valve assembly 122, a feed limit high valve assembly 124, a default disable valve assembly 126, a default select valve assembly 128, and a plurality of clutch A-F regulation valve assemblies 130, 132, 134, 136, 138, and 140 each associated with one of the torque transmitting mechanisms A-F, as will be described below.

The main supply line 114 communicates with, i.e. is connected to, the manual valve assembly 120 as well as the clutch A-E regulation valve assemblies 130-138. The manual valve assembly 120 includes a manual valve 142 connected to a range selector (not shown). Movement of the range selector by an operator of the motor vehicle 5 in turn translates the manual valve 142 between various positions including a reverse position and a drive position. The manual valve assembly 120 includes ports 120A-F, numbered consecutively from left to right in FIG. 2C. Ports 120A and 120F are exhaust ports that communicate with the sump 102. Port 120B is connected to a reverse feed line 144. Port 120C is connected to the main supply line 114. Ports 120D and 120E are connected to a drive feed line 146.

The manual valve 142 is slidably disposed within a bore 148 formed in the valve body 101. The manual valve 142 is moveable between at least a drive position and a reverse position, and may also include a neutral position or a park position. In the drive position, port 120C communicates with port 120D and port 120B exhausts through port 120A. In the reverse position, port 120C communicates with port 120B and port 120E exhausts through port 120F. Thus, pressurized fluid is selectively communicated from the main supply line 114 to one of the reverse feed line 144 and the drive feed line 146 depending on the position of the manual valve 142.

The feed limit low valve assembly 122 also receives pressurized hydraulic fluid from the pump 104 via a pump supply line 147 and a one-way valve 149. The pump supply line 147 is connected to the pump 104 upstream of the pressure regulator valve 112. The one-way valve 149 allows for fluid communication in one direction only from the pump 104 to the feed limit low valve assembly 122 and the feed limit high valve assembly 124. The feed limit low valve assembly 122 includes ports 122A-E, numbered consecutively from left to right in FIG. 2D. Ports 122A and 122C are connected to a feed limit low line 150. Port 122B is connected to the pump supply line 147. Ports 120D, 120E are exhaust ports that communicate with the sump 102 or an exhaust backfill circuit (not shown).

The feed limit low valve assembly 122 further includes a feed limit low valve or spool 152 slidably disposed within a bore 154 formed in the valve body 101. The feed limit low valve 152 is moveable to regulate pressurized hydraulic fluid flow from port 122B to port 122C using feedback pressure via port 122A. A biasing member 156, such as a coiled spring, biases the feed limit low valve 152 against the feedback pressure acting on the feed limit low valve 152 communicated through port 122A. Thus, the balance of forces acting on the feed limit low valve 152 controls the flow of hydraulic fluid from port 122B to port 122C.

The feed limit high valve assembly 124 operates in a manner similar to the feed limit low valve assembly 122, but is set at a relatively higher feedback pressure. The feed limit high valve assembly 124 also receives pressurized hydraulic fluid from the pump supply line 147. The feed limit high valve assembly 124 includes ports 124A-E, numbered consecutively from left to right in FIG. 2D. Ports 124A and 124C are connected to a feed limit high line 158. Port 124B is connected to the pump supply line 147. Ports 120D, 120E are exhaust ports that communicates with the sump 102 or an exhaust backfill circuit (not shown).

The feed limit high valve assembly 124 further includes a feed limit high valve or spool 160 slidably disposed within a bore 162 formed in the valve body 101. The feed limit high valve 160 is moveable to regulate pressurized hydraulic fluid flow from port 124B to port 124C using feedback pressure via port 124A. A biasing member 164, such as a coiled spring, biases the feed limit high valve 160 against the feedback pressure acting on the feed limit high valve 160 communicated through port 124A. Thus, the balance of forces acting on the feed limit high valve 160 controls the flow of hydraulic fluid from port 124B to port 124C.

The reverse and drive feed lines 144, 146 communicate with the default disable valve assembly 126. The default disable valve assembly 126 includes ports 126A-I, numbered consecutively from left to right in FIG. 2A. Port 126A is an exhaust port that communicates with the sump 102. Port 126B is connected to the feed limit low line 150. Ports 126C and 126F are connected to an exhaust backfill circuit 172 and blow-off valve 173 which preferably opens at low pressure, e.g., 3 psi. Port 126D is connected to a drive default line 174. Port 126E communicates with the drive feed line 146 via an orifice 58. The orifice 58 helps to minimize torque spikes during an initial default to 7$^{th}$ gear when the transmission 14 is operating at a lower gear. Port 126G is connected to a reverse default line 176. Port 126H is connected to the reverse feed line 144. Port 126I is connected to a signal line 178.

The default disable valve assembly 126 further includes a default valve or spool 180 slidably disposed within a bore 182 formed in the valve body 101. The default valve 180 is moveable between a default disable position, shown in FIG. 2A, and a default enable position, shown in FIGS. 3-5. A biasing member 184, such as a coiled spring, biases the default valve 180 to the default disable position. In the default disable position, port 126D communicates with port 126C, port 126E is closed, port 126F communicates with port 126G, and port 126H is closed. Thus, the drive default line 174 and reverse default line 176 exhaust and the drive feed line 146 and reverse feed line 144 are closed. In the default enable position, port 126C is closed, port 126D communicates with port 126E, port 126F is closed, and port 126G communicates with port 126H.

The default select valve assembly 128 is used to determine whether second or seventh gear is engaged during a transmission default condition. The default select valve assembly 128 includes ports 128A-I, numbered consecutively from left to right in FIG. 2A. Port 128A is connected to a signal line 186. Ports 128B and 128F are connected to the exhaust backfill circuit 172. Port 128C is connected to a clutch E/F exhaust line 188. The clutch E/F exhaust line 188 communicates with a drive default blow-off valve 189. The drive default blow-off valve 189, with the orifice 58, helps to minimize torque spikes during an initial default to 7$^{th}$ gear when the transmission 14 is operating at a lower gear. Port 128D is connected to the drive default line 174. Port 128E is connected to a clutch A/B exhaust line 190. Port 128G is connected to a valve F feed line 192. Port 128H is connected to the main supply line 114. Port 128I is connected to the reverse default line 176.

The default select valve assembly 128 further includes a default select valve or spool 194 slidably disposed within a bore 196 formed in the valve body 101. The default select valve 194 is moveable between a first position, shown in FIGS. 3 and 5, and a second position, shown in FIGS. 2A and 4. A biasing member 198, such as a coiled spring, biases the default select valve 194 to the first position. In the first position, port 128B communicates with port 128C, port 128D communicates with port 128E, port 128F communicates with port 128G, and port 128H is closed. In the second position, port 128B is closed, port 128C communicates with port 128D, port 128E communicates with port 128F, and port 128H communicates with port 128G.

The reverse default line 176 and the clutch A/B exhaust line 190 communicate with a three-way ball check valve 200. The three-way ball check valve 200 includes three ports 200A-C. Port 200A is connected to the reverse default line 176. Port 200B is connected to the clutch A/B exhaust line 190. Port 200C is connected to an exhaust line 202 having a clutch A branch 202A and a clutch B branch 202B. The clutch A branch 202A is connected with the clutch A regulation valve 130 and the clutch B branch 202B is connected with the clutch B regulation valve 132. The three-way ball check valve 200 closes off whichever of the ports 200A and 200B that is delivering the lower hydraulic pressure and provides communication between whichever of the ports 200A and 200B having or delivering the higher hydraulic pressure and the outlet port 200C.

The reverse default line 176 and the drive default line 174 communicate with a three-way ball check valve 204. The three-way ball check valve 204 includes three ports 204A-C. Port 204A is connected to the reverse default line 176. Port 204B is connected to the drive default line 174. Port 204C is connected to a clutch D exhaust line 206. The clutch D exhaust line is connected with the clutch D regulation valve 136. The three-way ball check valve 204 closes off whichever of the ports 204A and 204B that is delivering the lower hydraulic pressure and provides communication between whichever of the ports 204A and 204B having or delivering the higher hydraulic pressure and the outlet port 204C.

The reverse default line 176 and the clutch E/F exhaust line 188 communicate with a three-way ball check valve 208. The three-way ball check valve 208 includes three ports 208A-C. Port 208A is connected to the reverse default line 176. Port 208B is connected to the clutch E/F exhaust line 188. Port 208C is connected to a clutch F exhaust line 210. The clutch E/F exhaust line 188 includes a clutch E exhaust branch 188A that is connected to the clutch E regulation valve 138. The clutch F exhaust line 210 is connected with the clutch F regulation valve 140. The three-way ball check valve 208 closes off whichever of the ports 208A and 208B that is delivering the lower hydraulic pressure and provides communication between whichever of the ports 208A and 208B having or delivering the higher hydraulic pressure and the outlet port 208C.

The position of the default select valve assembly 128 may be commanded by pressurized fluid communicated through the signal line 186 from a three-way ball check valve 212. The three-way ball check valve 212 includes three ports 212A-C. Port 212A is connected to the signal line 178. Port 212B is connected to the valve F feed line 192. Port 212C is connected to the signal line 186. The three-way ball check valve 212 closes off whichever of the ports 212A and 212B that is delivering the lower hydraulic pressure and provides communication between whichever of the ports 212A and 212B having or delivering the higher hydraulic pressure and the outlet port 212C.

The signal line 178 which controls a position of the default disable valve assembly 126 as well as the default select valve assembly 128 via three-way ball check valve 212 is connected to a control device or solenoid 213. The solenoid 213 is fed hydraulic fluid via the feed limit low line 150. The solenoid 213 is preferably an on-off solenoid that selectively communicates the hydraulic fluid from the feed limit low line 150 to the signal line 178 upon receipt of a command from the transmission control module 40.

The main supply line 114 feeds the clutch A regulation valve 130, the clutch B regulation valve 132, the clutch C regulation valve 134, and the clutch D regulation valve 136, and the clutch E regulation valve 138. The main supply line 114 also feeds the valve F feed line 192 via the default select valve assembly 128 when in the second position.

The clutch A regulation valve assembly 130 controls the actuation of the clutch A. The clutch A regulation valve assembly 130 includes ports 130A-E, numbered consecutively from left to right in FIG. 2B. Port 130A is connected to the main supply line 114. Port 130B is connected to a clutch A feed line 220 that communicates with clutch A. Port 130C is connected to clutch A exhaust branch 202A and to the clutch A feed line 220 via an orifice 222. Port 130D is connected to a fluid line 224 that communicates with a one-way valve 226 and with the clutch A feed line 220 via an orifice 227. The one-way valve 226 communicates with the feed limit low line 150 and selectively allows fluid communication from the fluid line 224 to the feed limit low line 150. Port 130E exhausts to the sump 102.

The clutch A regulation valve assembly 130 further includes a clutch A valve or spool 230 slidably disposed within a bore 232 formed in the valve body 101. The clutch A valve 230 is moveable between a disengaged position where the valve 230 is moved to the left and an engaged position where the valve 230 is moved to the right. The clutch A valve 230 is moveable by a solenoid 234. The solenoid 234 is preferably a normally low, linear force solenoid. In the disengaged position, port 130A is isolated, port 130B communicates with port 130C to exhaust the clutch A feed line 220 through the clutch A exhaust branch 202A, and port 130D acts on a differential area of the clutch A valve 230. In the engaged position, port 130A communicates with port 130B to provide pressurized fluid to clutch A. Excess pressure in the fluid line 224 opens the one-way valve 226 when the pressure exceeds that provided by the feed limit low valve assembly 122, thus bleeding off the pressure acting on the differential area of the clutch A valve 230.

The clutch B regulation valve assembly 132 controls the actuation of the clutch B. The clutch B regulation valve assembly 132 includes ports 132A-E, numbered consecutively from left to right in FIG. 2B. Port 132A is connected to the main supply line 114. Port 132B is connected to a clutch B feed line 236 that communicates with clutch B. Port 132C is connected to clutch B exhaust branch 202B and to the clutch B feed line 236 via an orifice 238. Port 132D is connected to a fluid line 240 that communicates with a one-way valve 242 and with the clutch B feed line 236 via an orifice 243. The one-way valve 242 communicates with the feed limit low line 150 and selectively allows fluid communication from the fluid line 240 to the feed limit low line 150. Port 132E exhausts to the sump 102.

The clutch B regulation valve assembly 132 further includes a clutch B valve or spool 246 slidably disposed within a bore 248 formed in the valve body 101. The clutch B valve 246 is moveable between a disengaged position where the valve is moved to the left and an engaged position where the valve 246 is moved to the right. The clutch B valve 246 is moveable by a solenoid 250. The solenoid 250 is preferably a normally low, linear force solenoid. In the disengaged position, port 132A is isolated, port 132B communicates with port 132C to exhaust the clutch B feed line 236 through the clutch B exhaust branch 202B, and port 132D is acts on a differential area of the clutch B valve 246. In the engaged position, port 132A communicates with port 132B to provide pressurized fluid to clutch B. Excess pressure in the fluid line 240 opens the one-way valve 242 when the pressure exceeds that provided by the feed limit low valve assembly 122, thus bleeding off the pressure acting on the differential area of the clutch B valve 246.

The clutch C regulation valve assembly 134 controls the actuation of the clutch C. The clutch C regulation valve assembly 134 includes ports 134A-E, numbered consecutively from left to right in FIG. 2B. Port 134A is connected to the main supply line 114. Port 134B is connected to a clutch C feed line 252 that communicates with clutch C. Port 134C is connected to a clutch C exhaust branch 174A of the drive default line 174 and to the clutch C feed line 252 via an orifice 254. Port 134D is connected to a fluid line 256 that communicates with a one-way valve 258 and with the clutch C feed line 252 via an orifice 260. The one-way valve 258 communicates with the feed limit high line 158 and selectively allows fluid communication from the fluid line 256 to the feed limit high line 158. Port 134E exhausts to the sump 102.

The clutch C regulation valve assembly 134 further includes a clutch C valve or spool 264 slidably disposed within a bore 266 formed in the valve body 101. The clutch C valve 264 is moveable between a disengaged position where the valve 264 is moved to the left and an engaged position where the valve 264 is moved to the right. The clutch C valve 264 is moveable by a solenoid 268. The solenoid 268 is preferably a normally low, linear force solenoid. In the disengaged position, port 134A is isolated, port 134B communicates with port 134C to exhaust the clutch C feed line 252 through the drive default line 174, and port 134D acts on a differential area of the clutch C valve 264. In the engaged position, port 134A communicates with port 134B to provide pressurized fluid to clutch C. Excess pressure in the fluid line 256 opens the one-way valve 258 when the pressure exceeds that provided by the feed limit high valve assembly 124, thus bleeding off the pressure acting on the differential area of the clutch C valve 264.

The clutch D regulation valve assembly 136 controls the actuation of the clutch D. The clutch D regulation valve assembly 136 includes ports 136A-E. Port 136A is connected to the main supply line 114. Port 136B is connected to a clutch D feed line 266 that communicates with clutch D. Port 136C is connected to the clutch D exhaust line 206 and to the clutch D feed line 266 via an orifice 270. Port 136D is connected to the clutch D feed line 266 via an orifice 272. Port 136E is an exhaust port that communicates with the sump 102.

The clutch D regulation valve assembly 136 further includes a clutch D valve or spool 276 slidably disposed within a bore 278 formed in the valve body 101. The clutch D valve 276 is moveable between a disengaged position where the valve 276 is moved to the left and an engaged position where the valve 276 is moved to the right. The clutch D valve 276 is moveable by a solenoid 280. The solenoid 280 is preferably a normally low, linear force solenoid. In the disengaged position, port 136A is isolated, port 136B communicates with port 136C to exhaust the clutch D feed line 266 through the clutch D exhaust line 206, and port 136D acts on a differential area of the clutch D valve 276. In the engaged position, port 136A communicates with port 136B to provide pressurized fluid to the clutch D feed line 266, and port 136C is isolated.

The clutch E regulation valve assembly 138 controls the actuation of the clutch E. The clutch E regulation valve assembly 138 includes ports 138A-E, numbered consecutively from left to right in FIG. 2B. Port 138A is connected to the main supply line 114. Port 138B is connected to a clutch E feed line 282 that communicates with clutch E. Port 138C is connected to the clutch E exhaust branch 188A and to the clutch E feed line 282 via an orifice 284. Port 138D is connected to the clutch E feed line 282 via an orifice 286. Port 138E exhausts to the sump 102.

The clutch E regulation valve assembly 138 further includes a clutch E valve or spool 290 slidably disposed within a bore 292 formed in the valve body 101. The clutch E valve 290 is moveable between a disengaged position where the valve 290 is moved to the left and an engaged position where the valve 290 is moved to the right. The clutch E valve 290 is moveable by a solenoid 294. The solenoid 294 is preferably a normally low, linear force solenoid. In the disengaged position, port 138A is isolated, port 138B communicates with port 138C to exhaust the clutch E feed line 282 through the clutch E exhaust branch 188A, and port 138D acts on a differential area of the clutch E valve 290. In the engaged position, port 138A communicates with port 138B to provide pressurized fluid to clutch E and port 138C is isolated.

The clutch F regulation valve assembly 140 controls the actuation of the clutch F. The clutch F regulation valve assembly 140 includes ports 140A-E. Port 140A is connected to the valve F feed line 192. Port 140B is connected to a clutch F feed line 295 that communicates with clutch F. Port 140C is connected to the clutch F exhaust line 210 and to the clutch F feed line 295 via an orifice 296. Port 140D is connected to the clutch F feed line 295 via an orifice 298 and to a one-way valve 300 via a fluid line 302. The one-way valve 300 communicates with the feed limit high line 158 and selectively allows fluid communication from the fluid line 302 to the feed limit high line 158. Port 140E is an exhaust port that communicates with the sump 102.

The clutch F regulation valve assembly 140 further includes a clutch F valve or spool 306 slidably disposed within a bore 308 formed in the valve body 101. The clutch F valve 306 is moveable between a disengaged position where the valve 306 is moved to the left and an engaged position where the valve 306 is moved to the right. The clutch F valve 306 is moveable by a solenoid 310. The solenoid 310 is preferably a normally low, linear force solenoid. In the disengaged position, port 140A is isolated, port 140B communicates with port 140C to exhaust the clutch F feed line 295 through the clutch F exhaust line 210, and port 140D acts on a differential area of the clutch F valve 306. In the engaged position, port 140A communicates with port 140B to provide pressurized fluid to the clutch F feed line 295, and port 140C is isolated. Excess pressure in fluid line 302 opens the one-way valve 300 when the pressure exceeds that provided by the feed limit high valve assembly 124, thus bleeding off the pressure acting on the differential area of the clutch F valve 306.

The hydraulic control system 100 is operable to provide two alternative forward gear ratios and one reverse gear ratio during a transmission default condition. During a default condition where the transmission 14 experiences an absence of electronic control the transmission 14 no longer has the capability to electronically command solenoids to achieve the desired gear state. Accordingly, the solenoids 213, 234, 250, 268, 280, 294, and 310 are deactivated and the corresponding valves 230, 246, 264, 276, 290, and 306 are in the disengaged state. Meanwhile, the regulated pressure supplied to the main supply line 114 from the pressure regulator subsystem 106 defaults to the pressure provided from the pump 104 or the alternate pump 110.

Figure 3:
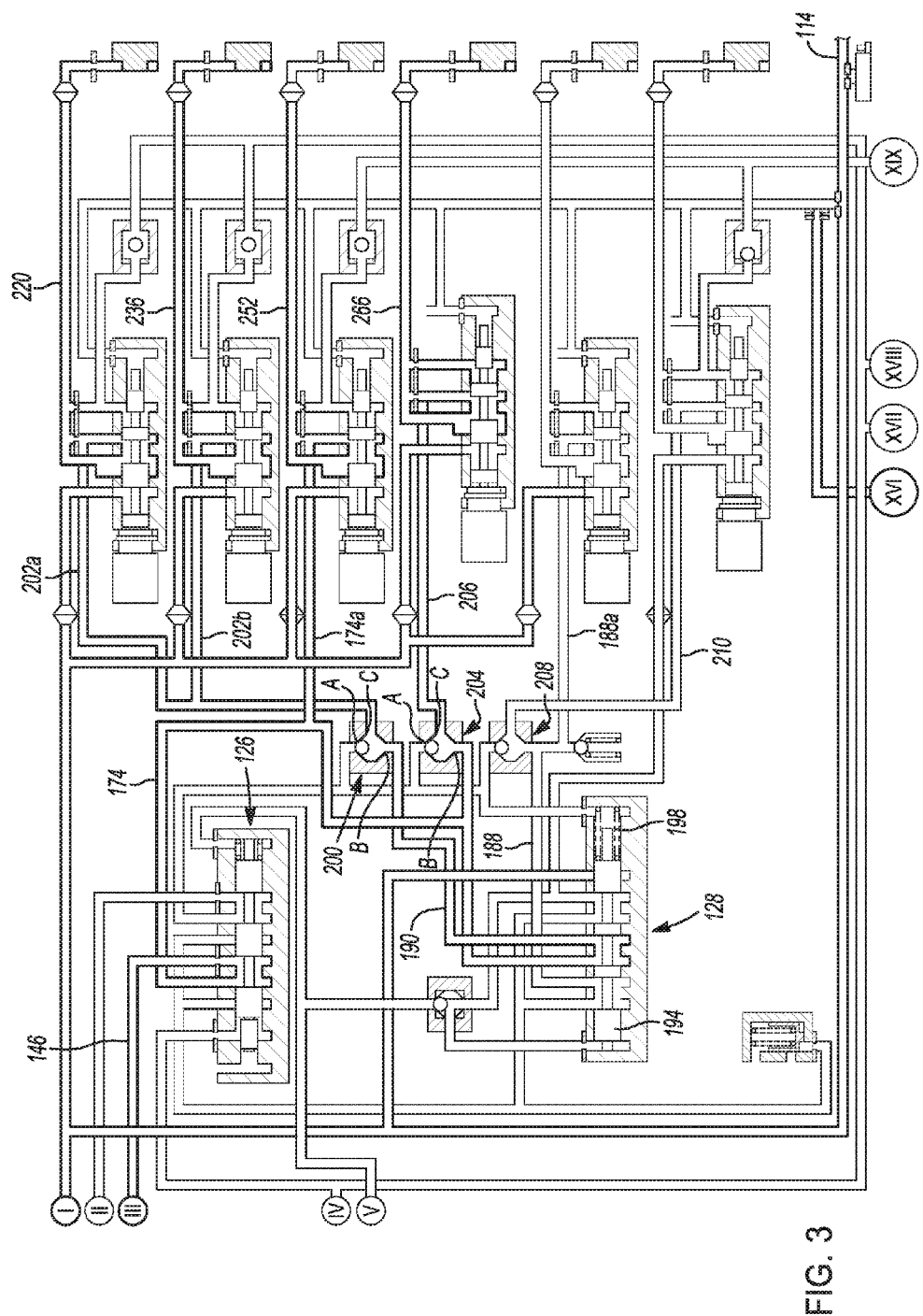
FIG. 3 is a diagram of a portion of the hydraulic control system in a default second forward gear condition according to the principles of the present disclosure.

With reference to FIG. 3, a default condition is illustrated where the transmission 14 provides the $2^{nd}$ gear ratio during the default. To establish the $2^{nd}$ gear ratio, clutches A, B, C, D must be engaged, i.e., supplied with pressurized oil. When the manual valve 142 is in the drive position (moved to the right in FIG. 2C), oil is communicated to the drive feed line 146. In the default condition the solenoid 213 closes, moving the default disable valve assembly 126 to the enable position. The drive feed line 146 thus feeds the drive default line 174. Pressurized oil then communicates into the clutch C exhaust branch 174A and into the clutch C feed line 252 to engage clutch C. Also, pressurized oil from the drive default line 174 closes port 204A of the three-way ball check valve 204 and pressurized oil communicates from the drive default line 174 to the clutch D exhaust line 206. Oil from the clutch D exhaust line 206 communicates into the clutch D feed line 266 to engage clutch D. During the default, spring 198 moves the valve 194 of the default select valve assembly 128 to the first position. Here, the drive default line 174 communicates with the clutch A/B exhaust line 190. Pressurized oil then closes port 200A of the three-way ball check valve 200 and pressurized oil communicates into the clutch A exhaust branch 202A and the clutch B exhaust branch 202B. Pressurized oil communicates from the clutch A exhaust branch 202A into the clutch A feed line 220 to engage clutch A while pressurized oil communicates from the clutch B exhaust branch 202B into the clutch B feed line 236 to engage clutch B. Meanwhile, clutch E exhausts through the clutch E exhaust branch 188A to the clutch E/F exhaust line 188 and F exhausts through the clutch F exhaust line 210, the three-way ball check valve 208, into the clutch E/F exhaust line 188. Therefore, during the low gear default condition, clutches A, B, C, and D are engaged, thereby providing a second gear ratio.

Figure 4:
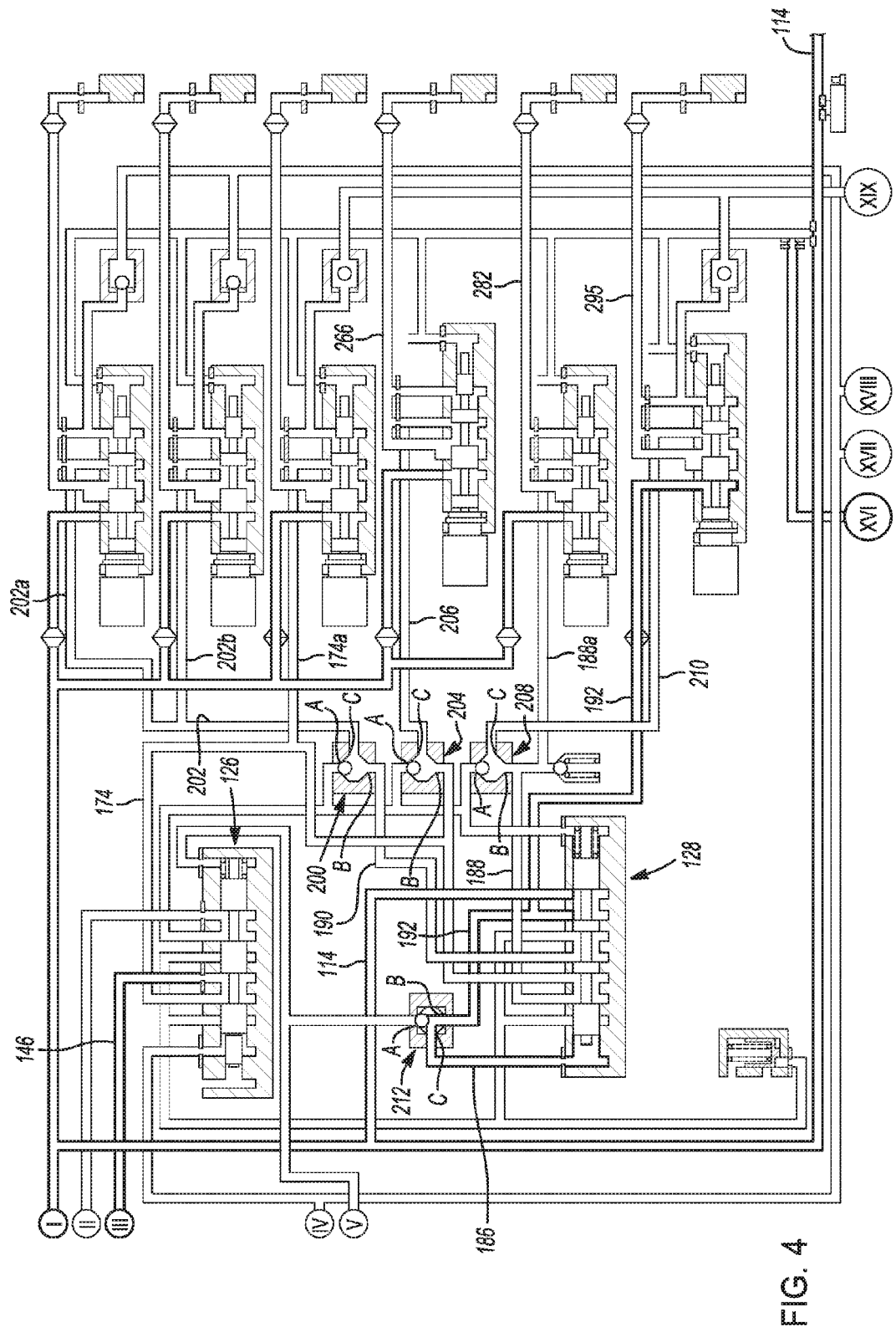
FIG. 4 is a diagram of a portion of the hydraulic control system in a default seventh forward gear condition according to the principles of the present disclosure.

With reference to FIG. 4, a default condition is illustrated where the transmission 14 provides the $7^{th}$ gear ratio during the default. To establish the $7^{th}$ gear ratio, clutches C, D, E, F must be engaged, i.e., supplied with pressurized hydraulic fluid or oil. During normal operations, the solenoid 213 is opened and moves the default select valve assembly 128 to the second position. When the manual valve 142 is in the drive position (moved to the right in FIG. 2C), oil is communicated to the drive feed line 146. In the default condition the solenoid 213 closes, moving the default disable valve assembly 126 to the enable position. The drive feed line 146 thus feeds the drive default line 174. Pressurized oil then communicates into the clutch C exhaust branch 174A and into the clutch C feed line 252 to engage clutch C. Also, pressurized oil from the drive default line 174 closes port 204A of the three-way ball check valve 204 and pressurized oil communicates from the drive default line 174 to the clutch D exhaust line 206. Oil from the clutch D exhaust line 206 communicates into the clutch D feed line 266 to engage clutch D. If the default occurs when the motor vehicle 5 is running in any gear while in a Drive position, pressurized oil from the main supply line 114 communicates into the valve F feed line 192, closes port 212A of the three-way ball check valve 212, and keeps the default select valve assembly 128 in the second position. Thus, the drive default line 174 communicates with the clutch E/F exhaust line 188 through the default select valve assembly 128. Pressurized oil then closes port 208A of the three-way ball check valve 208 and pressurized oil communicates into the clutch F exhaust line 210. Pressurized oil also communicates from the clutch E/F exhaust line 188 into the clutch E exhaust branch 188A. Pressurized oil communicates from the clutch E exhaust branch 188A into the clutch E feed line 282 to engage clutch E while pressurized oil communicates from the clutch F exhaust line 210 into the clutch F feed line 295 to engage clutch F. Meanwhile, clutch A exhausts through the clutch A exhaust branch 202A to the clutch A/B exhaust line 202 and B exhausts through the clutch B exhaust branch 202B to the clutch A/B exhaust line 202. The exhaust from the clutches A, B closes port 200A of the three-way ball check valve 200 and exhausts through the default select valve assembly 128. Therefore, during the default condition, clutches C, D, E, and F are engaged, thereby providing the $7^{th}$ gear ratio. The default select valve assembly 128 transitions from the second position, enabling $7^{th}$ gear, to the first position, enabling $2^{nd}$ gear, when pressurized oil from the reverse default line 144 and the reverse default line 176 breaks the latch on the default select valve assembly 128 after a shift to reverse. The default select valve assembly 128 also transitions from the second position to the first position after a loss of all hydraulic pressure, for example when the engine 12 and pump 104 are turned off. In addition, by routing supply of pressurized oil from the main supply line 114 to the clutch F feed line 192 through the default select valve assembly 128, clutch F cannot be applied unless the default select valve assembly 128 is in the second (default $7^{th}$ gear) position. Since clutch F is required to engage $4^{th}$-$10^{th}$ gears, this ensures that there is no possibility of a default from $4^{th}$-$10^{th}$ gears to $2^{nd}$ gear if the default select valve 194 becomes stuck in the first ($2^{nd}$ gear) position.

Figure 5:
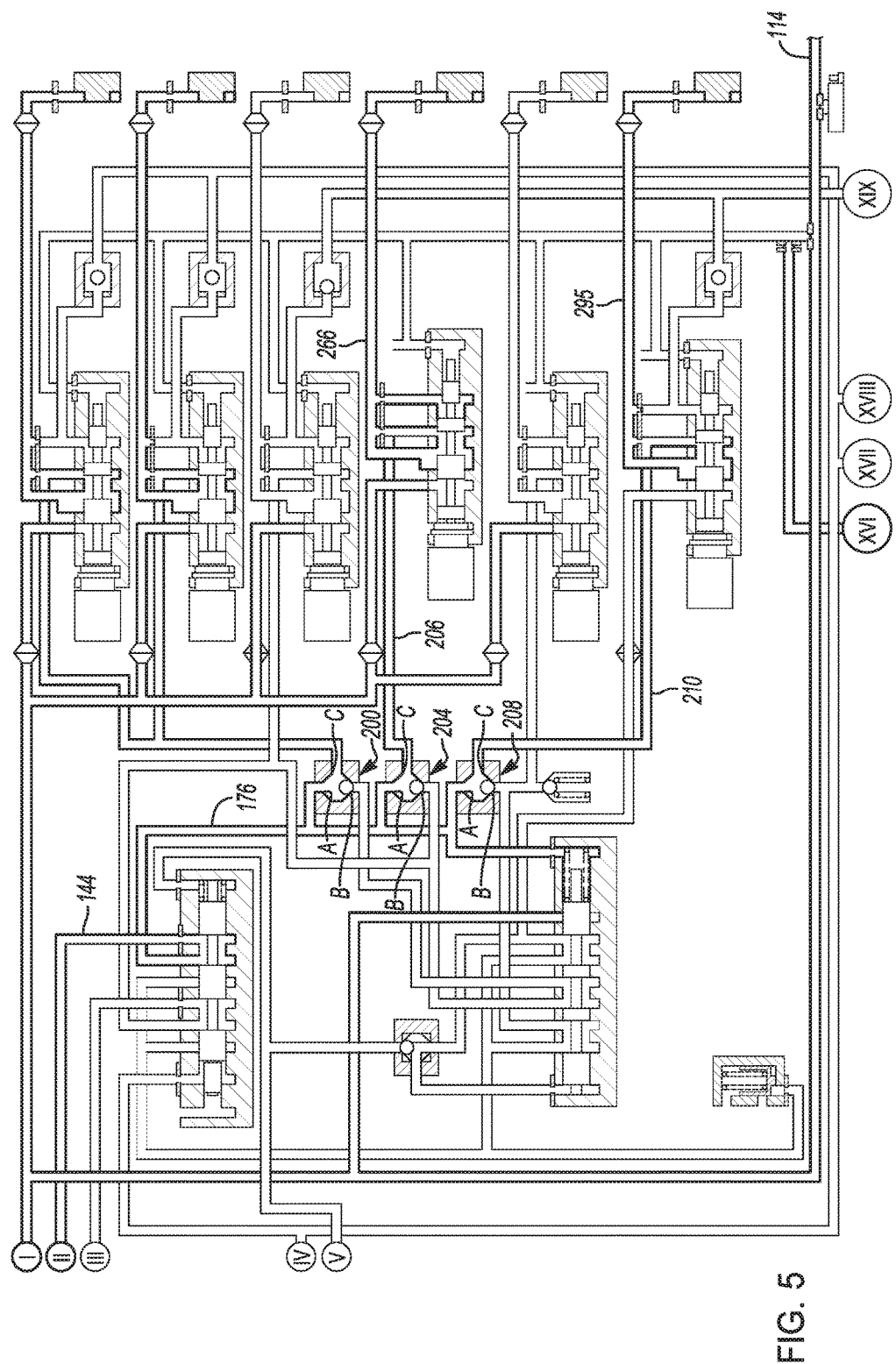
FIG. 5 is a diagram of a portion of the hydraulic control system in a default reverse condition according to the principles of the present disclosure.

Turning to FIG. 5, a default condition while in a reverse gear state is illustrated. To establish a reverse gear ratio, clutches A, B, D, F must be engaged, i.e., supplied with pressurized hydraulic fluid or oil. When the manual valve assembly 120 is in the reverse position (moved to the left in FIG. 2C), oil is communicated to the reverse feed line 144. In the default condition the solenoid 213 closes, moving the default disable valve assembly 126 to the enable position. The reverse feed line 144 thus feeds the reverse default line 176. Pressurized oil from the reverse default line 176 then closes off ports 200B, 204B, and 208B of the three-way ball check valves 200, 204, and 208, respectively. Pressurized oil communicates into the clutch A exhaust branch 202A and the clutch B exhaust branch 202B from the three-way ball check valve 200. From the clutch A exhaust branch 202A, pressurized oil feeds into the clutch A feed line 220 to engage clutch A while pressurized oil feeds from the clutch B exhaust branch 202B into the clutch B feed line 236 to engage clutch B. Pressurized oil communicates into the clutch D exhaust line 206 from the three-way ball check valve 204. From the clutch D exhaust line 206, pressurized oil communicates into the clutch D feed line 266 to engage clutch D. Finally, Pressurized oil communicates into the clutch F exhaust line 210 from the three-way ball check valve 208. From the clutch F exhaust line 210, pressurized oil communicates into the clutch F feed line 295 to engage clutch F. Clutches C and E exhaust through the default select valve assembly 128. Therefore, during the default condition while the manual valve assembly 120 is in reverse, clutches A, B, D, and F are engaged, thereby providing a reverse gear ratio.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a transmission of a motor vehicle, the hydraulic control system comprising:
    a pressure regulation subsystem in fluid communication with a pump for providing pressurized hydraulic fluid;
    a manual valve assembly in direct fluid communication with the pressure regulation subsystem, wherein the manual valve assembly is moveable by an operator of the motor vehicle between at least a park position, a neutral position, a drive position, and a reverse position;
    a default disable valve assembly in direct fluid communication with the manual valve assembly;
    a solenoid in direct fluid communication with the default disable valve assembly; and
    a default select valve assembly in direct fluid communication with the default disable valve assembly,
    wherein the manual valve assembly is in direct fluid communication with the default disable valve assembly which is in direct fluid communication with the solenoid and the default select valve assembly, wherein the solenoid enables the default disable valve assembly to enable three default modes of operation and the default select valve assembly selects between two of the three default modes of operation.

2. The hydraulic system of claim 1 further comprising a plurality of clutches and a plurality of clutch regulation valve assemblies each in direct fluid communication with the pressure regulation subsystem and in fluid communication with the manual valve assembly, and in fluid communication with the default disable valve assembly, and in communication with the default select valve assembly, wherein the plurality of clutches is selectively engaged by the plurality of clutch regulation valve assemblies.

3. The hydraulic control system of claim 2 wherein each of the plurality of clutch regulation valve assemblies includes an exhaust port that exhausts a respective one of the plurality of clutches in a normal mode of operation and wherein each of the exhaust ports is in selective communication with the default disable valve assembly and the default select valve assembly for selectively receiving pressurized hydraulic fluid to provide two forward gears and a reverse gear during a default mode of operation.

4. The hydraulic control system of claim 3 wherein the exhaust ports of each of the plurality of clutch regulation valve assemblies selectively communicates with the default disable valve assembly or the default select valve assembly via a plurality of three-way valves.

5. The hydraulic control system of claim 4 wherein the default disable valve assembly selectively communicates pressurized hydraulic fluid from the manual valve assembly when in the drive position to the default select valve assembly, and wherein the default select valve assembly selectively communicates the pressurized hydraulic fluid to one of a first subset of the clutch regulation valve assemblies to provide a low gear ratio and to a second subset of the clutch regulation valve assemblies to provide a high gear ratio higher than the low gear ratio.

6. The hydraulic control system of claim 5 wherein the default disable valve assembly selectively communicates pressurized hydraulic fluid from the manual valve assembly when in the reverse position to a subset of the plurality of three-way valves to provide a reverse gear ratio.

7. The hydraulic control system of claim 6 wherein the position of the default disable valve assembly is controlled by pressurized hydraulic fluid from the manual valve assembly when in the drive or reverse positions and from pressurized hydraulic fluid from a feed limit valve assembly and a spring.

8. The hydraulic control system of claim 7 wherein the position of the default select valve assembly is controlled by pressurized hydraulic fluid from the manual valve assembly and a biasing member when engaged in the high gear, from at least one of the plurality of clutch regulation valve assemblies engaged in the low gear and the biasing member, and from the manual valve assembly and at least one of the plurality of clutch regulation valve assemblies engaged in the reverse gear.

9. The hydraulic control system of claim 1 wherein the plurality of clutches includes six clutches selectively engageable in combinations of four to provide at least 10 forward speed ratios and one reverse speed ratio.

10. A hydraulic control system for a transmission of a motor vehicle, the hydraulic control system comprising:
a pressure regulation subsystem in fluid communication with a pump for providing pressurized hydraulic fluid;
a manual valve assembly in direct fluid communication with the pressure regulation subsystem, wherein the manual valve assembly is moveable by an operator of the motor vehicle between at least a park position, a neutral position, a drive position, and a reverse position and selectively provides a drive fluid signal and a reverse fluid signal from the pressurized hydraulic fluid;
a solenoid in fluid communication with the pressure regulation subsystem;
a default disable valve assembly in fluid communication with the solenoid, wherein the solenoid selectively engages the default disable valve assembly through an ON/OFF signal, and wherein the default disable valve assembly receives the drive fluid signal and the reverse fluid signal, and the default disable valve assembly has a first position that terminates the drive fluid signal and the reverse fluid signal when the default disable valve assembly receives the ON signal from the solenoid, and wherein the default disable valve assembly has a second position that communicates the drive fluid signal and the reverse fluid signal to a drive default fluid signal and a reverse default fluid signal when the default disable valve assembly receives the OFF signal from the solenoid;
a default select valve assembly that receives the drive default fluid signal, the default select valve assembly having a first position that communicates the drive default fluid signal to a first exhaust signal and a second position that communicates the drive default fluid signal to a second exhaust signal;
a plurality of clutch regulation valve assemblies each in direct fluid communication with the pressure regulation subsystem and selectively in fluid communication with the first exhaust signal, the second exhaust signal, the drive default signal, and the reverse default signal; and
a plurality of clutches selectively engaged by the plurality of clutch regulation valve assemblies,
wherein the solenoid enables the default disable valve assembly, and the default disable valve assembly enables three default modes of operation and the default select valve assembly selects between two of the three default modes of operation.

11. The hydraulic control system of claim 10 wherein the three default modes of operation include a low forward gear, a high forward gear, and a reverse gear, and the default select valve assembly selects between the low forward gear and the high forward gear.

12. The hydraulic control system of claim 11 wherein the plurality of clutches includes six clutches selectively engageable in combinations of four to provide at least 10 forward speed ratios and one reverse speed ratio.

13. The hydraulic control system of claim 12 wherein the plurality of clutch regulation valve assemblies includes six clutch regulation valve assemblies, each one in fluid communication with a respective one of the six clutches, and wherein each of the six clutch regulation valve assemblies includes an exhaust port that exhausts a respective one of the six clutches.

14. The hydraulic control system of claim 13 wherein in the low gear the first exhaust signal communicates with a first and a second of six exhaust ports via a first three way valve, the drive default signal directly communicates with a third of the six exhaust ports, and the drive default signal communicates with a fourth of the six exhaust ports via a second three way valve, and
wherein in the high gear the second exhaust signal communicates with a fifth and a sixth of the six exhaust ports via a third three way valve, the drive default signal directly communicates with the third of the six exhaust ports, and the drive default signal communicates with the fourth of the six exhaust ports via the second three way valve.

15. The hydraulic control system of claim 14 wherein the first exhaust signal and drive default signal selectively engages a first subset of clutches to produce the low forward gear and the second exhaust signal and drive default signal selectively engages a second subset of clutches to produce the high forward gear when the hydraulic control system is in a default mode of operation and the manual valve assembly is in the drive position.

16. The hydraulic control system of claim 15 wherein the low forward gear ratio is automatically engaged after the operator of the motor vehicle performs a key cycle on the motor vehicle while the solenoid provides the OFF signal, or when the operator of the motor vehicle moves the manual valve assembly from the drive position, to the reverse position and back to the drive position.

17. The hydraulic control system of claim 16 wherein the reverse default signal communicates with the first and second exhaust ports via the first three way valve, the reverse signal communicates with the fourth exhaust port via the second three way valve, and the reverse signal communicates with the sixth exhaust port via the third three way valve.

18. The hydraulic control system of claim 17 wherein the reverse default signal engages a third subset of clutches to produce the reverse gear when the hydraulic control system is in the default mode of operation and the manual valve assembly is in the reverse position.

19. A hydraulic control system for a transmission of a motor vehicle, the hydraulic control system comprising:
a pressure regulation subsystem in fluid communication with a pump for providing pressurized hydraulic fluid;
a plurality of clutches for producing a plurality of forward gear ratios and a reverse gear ratio when selectively engaged;
a manual valve assembly in direct fluid communication with the pressure regulation subsystem, wherein the manual valve assembly is moveable by an operator of the motor vehicle between at least a park position, a neutral position, a drive position, and a reverse position and selectively provides a drive fluid signal and a reverse fluid signal from the pressurized hydraulic fluid;

a solenoid in fluid communication with the pressure regulation subsystem, wherein the solenoid selectively engages the default disable valve assembly through an ON/OFF signal, and wherein the default disable valve assembly receives the drive fluid signal and the reverse fluid signal, and the default disable valve assembly has a first position that terminates the drive fluid signal and the reverse fluid signal and when the default disable valve assembly receives the ON signal from a solenoid, and a second position that communicates the drive fluid signal and the reverse fluid signal to a reverse default fluid signal when the default disable valve assembly receives the OFF signal from the solenoid;

a default select valve assembly that receives the drive default fluid signal, the default select valve assembly having a first position that communicates the drive default fluid signal to a first exhaust signal and a second position that communicates the drive default fluid signal to a second exhaust signal;

a plurality of clutch regulation valve assemblies each in direct fluid communication with the pressure regulation subsystem and selectively in fluid communication with the first exhaust signal, the second exhaust signal, the drive default signal, and the reverse default signal, the plurality of clutch regulation valve assemblies each having a disengaged position and an engaged position, wherein when in the engaged position the clutch regulation valve assemblies communicate the pressurized fluid from the pressure regulation subsystem to the plurality of clutches and when in a disengaged system communicate the plurality of clutches with an exhaust port, wherein during a default condition, the default disable valve assembly moves to the second position and the default select valve assembly initially selectively defaults to the first position or the second position based on which of the plurality of clutches are currently engaged when the default condition occurs in order to provide a low forward gear or a high forward gear when the manual valve assembly is in the drive position, or a reverse gear when the manual valve assembly is in the reverse position, and subsequently the default select valve assembly remains in the first position in order to provide a low forward gear when the operator of the motor vehicle performs a key cycle on the motor vehicle or when the operator moves the manual valve assembly from the drive position, to the reverse position and back to the drive position.

20. The hydraulic control system for a transmission of a motor vehicle of claim 19 wherein the low forward gear is a second gear ratio, and the high forward gear is a seventh gear ratio.

* * * * *